(12) United States Patent
Ciuperca

(10) Patent No.: US 8,966,845 B1
(45) Date of Patent: Mar. 3, 2015

(54) INSULATED REINFORCED FOAM SHEATHING, REINFORCED VAPOR PERMEABLE AIR BARRIER FOAM PANEL AND METHOD OF MAKING AND USING SAME

(71) Applicant: Romeo Ilarian Ciuperca, Norcross, GA (US)

(72) Inventor: Romeo Ilarian Ciuperca, Norcross, GA (US)

( * ) Notice: Subject to any disclaimer, the term of this patent is extended or adjusted under 35 U.S.C. 154(b) by 0 days.

(21) Appl. No.: 14/229,566

(22) Filed: Mar. 28, 2014

(51) Int. Cl.
*E04B 1/74* (2006.01)
*E04B 2/02* (2006.01)

(52) U.S. Cl.
CPC .................................... *E04B 2/02* (2013.01)
USPC .................................. 52/405.3; 52/309.12

(58) Field of Classification Search
USPC .................... 52/405.3, 309.12, 309.17, 407.1
See application file for complete search history.

(56) References Cited

U.S. PATENT DOCUMENTS

| | | | |
|---|---|---|---|
| 2,053,135 A | 10/1935 | Dalton | |
| 3,646,715 A * | 3/1972 | Pope | 52/309.9 |
| 3,732,138 A | 5/1973 | Almog | |
| 4,229,497 A * | 10/1980 | Piazza | 428/71 |
| 4,564,554 A | 1/1986 | Mikuski | |
| 4,646,498 A | 3/1987 | Schneller et al. | |
| 4,866,897 A | 9/1989 | Yount | |
| 4,947,600 A * | 8/1990 | Porter | 52/235 |
| 5,493,837 A | 2/1996 | Hepler | |
| 6,725,616 B1 * | 4/2004 | Pease | 52/309.7 |
| 6,729,090 B2 * | 5/2004 | Messenger et al. | 52/309.12 |
| 6,898,908 B2 * | 5/2005 | Messenger et al. | 52/268 |
| 6,935,081 B2 | 8/2005 | Dunn et al. | |
| 7,984,591 B2 * | 7/2011 | Cashin et al. | 52/63 |
| 8,012,301 B2 | 9/2011 | Schiffmann et al. | |
| 8,532,815 B1 | 9/2013 | Ciuperca | |
| 8,534,028 B2 | 9/2013 | Wojtusik et al. | |
| 8,545,749 B2 | 10/2013 | Ciuperca | |
| 8,555,583 B2 | 10/2013 | Ciuperca | |
| 8,555,584 B2 | 10/2013 | Ciuperca | |
| 8,607,531 B2 | 12/2013 | Schiffmann et al. | |
| 8,636,941 B1 | 1/2014 | Ciuperca | |
| 8,745,943 B2 * | 6/2014 | Ciuperca | 52/309.7 |
| 8,756,890 B2 | 6/2014 | Ciuperca | |
| 2002/0189182 A1 * | 12/2002 | Record | 52/309.9 |
| 2006/0144005 A1 * | 7/2006 | Tonyan et al. | 52/653.1 |
| 2009/0042471 A1 * | 2/2009 | Cashin et al. | 442/182 |
| 2013/0001820 A1 * | 1/2013 | Kraus et al. | 264/46.4 |
| 2014/0084132 A1 | 3/2014 | Ciuperca | |

(Continued)

OTHER PUBLICATIONS

U.S. Appl. No. 14/227,490, filed Mar. 27, 2014.

(Continued)

*Primary Examiner* — Basil Katcheves
(74) *Attorney, Agent, or Firm* — Robert E. Richards

(57) ABSTRACT

The invention comprises a product. The product comprises a composite panel comprising a foam insulating panel having a first primary surface and an opposite second primary surface, and a first layer of a polymeric elastomeric material on the first primary surface such that at least a portion of a first layer of reinforcing material is at least partially embedded in the polymeric elastomeric material. The composite panel also comprises a fastener for attaching the composite panel to a framing structure, wherein the fastener comprises a washer and wherein at least a portion of the first layer of a polymeric elastomeric material and the first layer of reinforcing material are disposed between the washer and the first primary surface. A method of making and using the composite panel is also disclosed.

20 Claims, 8 Drawing Sheets

(56) References Cited

U.S. PATENT DOCUMENTS

2014/0087158 A1 3/2014 Ciuperca
2014/0174647 A1 6/2014 Ciuperca

OTHER PUBLICATIONS

Preliminary Amendment filed on Mar. 27, 2014 in U.S. Appl. No. 14/227,490, filed Mar. 27, 2014.
Office Action mailed Apr. 18, 2014 in U.S. Appl. No. 14/040,965, filed Sep. 30, 2013.
Response filed May 23, 2014 in U.S. Appl. No. 14/040,965, filed Sep. 30, 2013.
U.S. Appl. No. 13/834,574, filed Mar. 15, 2013.
U.S. Appl. No. 13/834,697, filed Mar. 15, 2013.
ZIP System Brand Brochure.
Office Action mailed Oct. 10, 2014 in U.S. Appl. No. 14/227,490, filed Mar. 27, 2014.
Response file Dec. 3, 2014 in U.S. Appl. No. 14/229,566, filed Mar. 28, 2014.
Second Preliminary Amendment file Dec. 3, 2014 in U.S. Appl. No. 14/311,310, filed Jun. 22, 2014.
U.S. Appl. No. 14/531,644, filed Nov. 3, 2014.
Preliminary Amendment filed Nov. 3, 2014 in U.S. Appl. No. 14/531,644, filed Nov. 3, 2014.
Amendment and Response to Office Action filed Dec. 3, 2014 in U.S. Appl. No. 14/229,566, filed Mar. 28, 2014.
Office Action mailed Oct. 9, 2014 in U.S. Appl. No. 13/626,103, filed Sep. 25, 2012.

\* cited by examiner

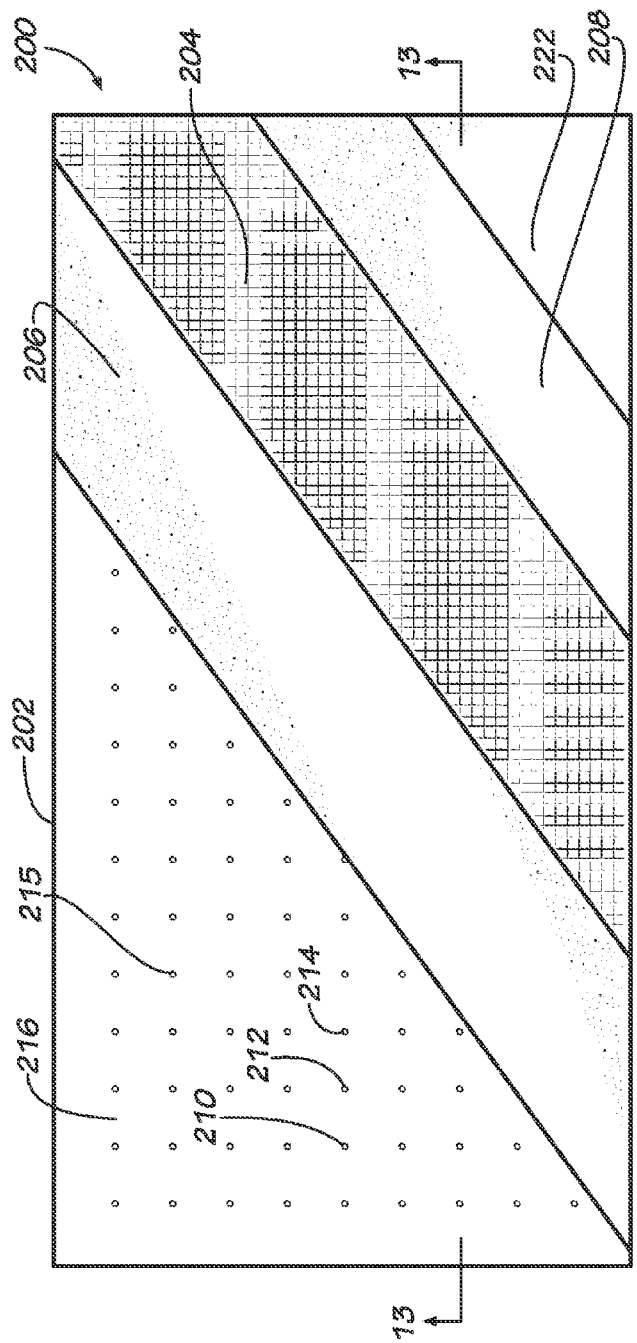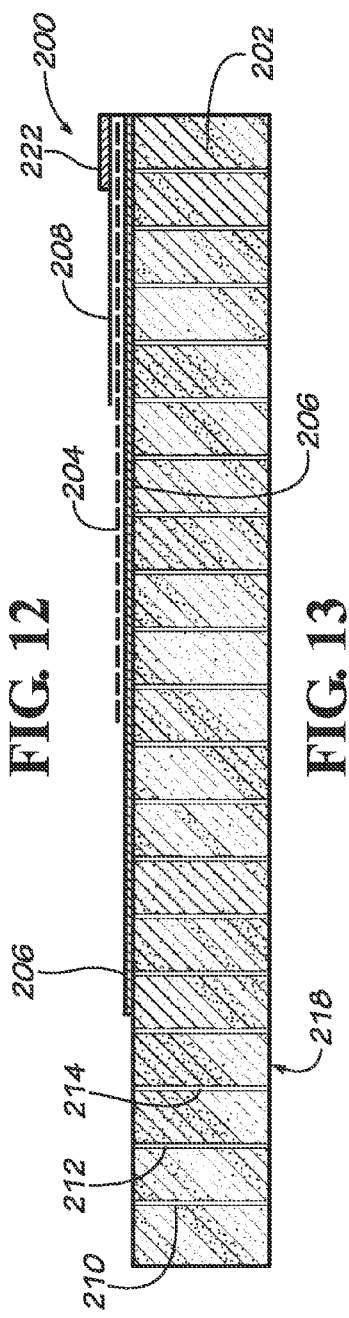

INSULATED REINFORCED FOAM SHEATHING, REINFORCED VAPOR PERMEABLE AIR BARRIER FOAM PANEL AND METHOD OF MAKING AND USING SAME

FIELD OF THE INVENTION

The present invention generally relates to sheathing. More particularly, this invention relates to a system for insulating structures, such as residential and commercial buildings. The present invention also relates to an insulated sheathing product. The present invention also relates to an insulated sheathing that is an air barrier but allows vapor transmission. The present invention also relates to making a reinforced foam panel fire resistant. The present invention also relates to an insulated sheathing in which the vapor permeability can be varied. The present invention also relates to a method of insulating structures, such as residential and commercial buildings.

BACKGROUND OF THE INVENTION

In buildings, energy loss takes place primarily through the building envelope. The building envelope consists of doors, windows, and exterior wall and roofing systems.

Walls typically use metal or wood studs to form a frame that can be either load bearing or infill. Multistory buildings can be made of a cast-in-place concrete or steel frame with the exterior perimeter walls being in-filled frame construction between the concrete or steel frame. Once the in-fill frame is installed, exterior sheathing is attached to the exterior side of the frame. On the inside, drywall is often used for the finished surface. This framing system creates a cavity between the exterior sheathing and the drywall. The wall cavity is then filled with batt insulation to insulate the building and improve energy efficiency. However, there are several drawbacks of this system. Framing members create thermal bridging. Batt insulation may not completely fill the cavity wall and over time it can sag leaving no insulation in some portions of the wall. Moisture condensation inside cavity walls is common and may dampen batt insulation within the wall cavity. When this occurs, the damp batt insulation loses most, if not all, insulating properties. In certain climates, a vapor barrier is required to be installed in the wall assembly. While this can help in certain seasons and climates, the year-round changes in temperature, humidity and pressure differential between the interior and exterior of the building make the use of vapor barriers problematic.

Building HVAC systems create pressure differentials between the interior and the exterior of the building. These pressure differentials cause air to move through the exterior wall system. This action is known as HVAC fan pressure. Along with wind, and atmospheric pressure changes, these factors cause air infiltration or exfiltration.

Wind pressure tends to positively pressurize a building on the façade against which it is blowing. And, as wind goes around a corner of a building it cavitates and speeds up considerably, creating especially strong negative pressures at corners and weaker negative pressure on the rest of the building walls and roof.

Stack pressure (or chimney effect) is caused by a difference in atmospheric pressure at the top and bottom of a building due to the difference in temperature, and, therefore, a difference in the weight of columns of air indoors vs. outdoors, especially in winter. In cold climates, stack effect can cause infiltration of air at the bottom of the building and exfiltration at the top. The reverse occurs in warm climates as a result of air-conditioning.

Fan pressure is caused by HVAC system pressurization, usually positively, which is beneficial in warm climates but can cause incremental enclosure problems to wind and stack pressures in climates requiring heating. Infiltration and exfiltration of air in buildings have serious consequences, when they are uncontrolled; the infiltrating air is untreated, and, therefore, can bring pollutants, allergens, and bacteria into buildings. Another serious consequence of infiltration and exfiltration through the building enclosure is condensation of moisture from the exfiltrating air in northern climates, and from infiltrating hot humid air in southern climates, causing mold growth, decay, and corrosion in the wall cavity. This can cause health problems for the building occupants and building material decay with premature building deterioration. Unlike the moisture transport mechanism of diffusion, air pressure differentials can transport hundreds of times more water vapor through air leaks in a building enclosure over the same period of time. This water vapor can condense within a building in a concentrated manner as the air contacts surfaces within the building that are at a temperature below the air's dew-point.

To improve energy efficiency, and to control air infiltration and exfiltration, building codes have recently required the use of air barriers on the exterior sheathing. Air barriers are required on the exterior sheathing to eliminate air exchange. The important features of an air barrier system are: continuity, structural support, air impermeability, and durability. An air barrier has to be continuous and must be interconnected to seal all other elements such as windows, doors and penetrations. Effective structural support requires that any component of an air barrier system must resist the positive or negative structural loads that are imposed on that component by wind, stack effect, and HVAC fan pressures without rupture, displacement or undue deflection. This load must then be safely transferred to the structure. Materials selected to be part of an air barrier system should be chosen with care to avoid materials that are too air-permeable, such as fiberboard, perlite board, and uncoated concrete block. The air permeance of a material is measured using ASTM E 2178 test protocol and is reported in Liters/second per square meter at 75 Pa pressure (cfm/ft$^2$ at 0.3" w·g or 1.57 psf). The Canadian and IECC codes and ASHRAE 90.1-2010 consider 0.02 L/s·m$^2$ 75 Pa (0.004 cfm/ft$^2$ at 1.57 psf), which happens to be the air permeance of a sheet of ½" unpainted gypsum wall board, as the maximum allowable air leakage for a material that can be used as part of an air barrier system for an opaque enclosure. In order to achieve an airtight structure, the basic materials selected for the air barrier must be highly air-impermeable. The U.S. Army Corps of Engineers (USACE) and the Naval Facilities Command (NAVFAC) have established 0.25 cfm/ft$^2$ at 1.57 psf (1.25 L/s·m$^2$ at 75 Pa) as the maximum air leakage for an entire building (airflow tested in accordance with the USACE/ABAA Air Leakage Test Protocol, which incorporates ASTM E 779); whereas the U.S. Air Force and the International Green Construction Code (IgCC) specify 0.4 cfm/ft$^2$ at 1.57 psf ((2.0 L/s·m$^2$@ 75 Pa) divided by the area of the enclosure pressure boundary). Materials selected for an air barrier system must perform their function for the expected life of the structure; otherwise they must be accessible for periodic maintenance.

An air barrier, unlike the vapor retarder (which stops air movement, but does not control diffusion), can be located anywhere in an enclosure assembly. If it is placed on the predominantly warm, humid side (high vapor pressure side)

of an enclosure or building, it can control diffusion as well, and should be a low-perm vapor barrier material. In such case, it is called an "air and vapor barrier." If placed on the predominantly cool, drier side (low vapor pressure side) of an enclosure or building, it should be vapor permeable (5-10 perms or greater).

Air barriers can have different vapor permeability ratings. Various building codes bodies classify them as vapor permeable, vapor barriers (vapor impermeable) and vapor retarders (vapor semi-permeable). Elastomeric vapor permeable air barrier have a vapor permeability rating of at least 1-10 perms. Vapor impermeable air barriers have a vapor permeability rating of less than 0.1 perms. Vapor retardant air barriers have a vapor permeability rating of between 0.1 perms and 1 perm.

The ASHRAE Standard 90.1 classifies the 50 states of the USA in at least 8 distinct climate zones. Building codes require a continuous air barrier membrane over the exterior of a building and continuous foam insulation over the structural framing members in all climate zones. However depending on the climate zone, the air barrier requirement can be any one of the three discussed above. For example in hot climates, such a Zones 2 and 3, an air barrier has to be vapor permeable, while in very cold climate, such as Zone 7, an air barrier has to be vapor impermeable. These various factors make it challenging to product manufacturers, designers and contractors to provide the proper solution for each location.

Walls constructed from materials that are very permeable to air, must be air tightened using an applied elastomeric (flexible) coating, either as a specially formulated coating, or a specially formulated air barrier sheet product, or a fluid-applied spray-on or trowel-on material. It has been found that elastomeric polymer coatings are the most effective type of products that meet all of the above criteria.

Thermal performance of the building envelope influences the energy demand of a building in two ways. It affects annual energy consumption, and, therefore, the operating costs for building heating, cooling, and humidity control. It also influences peak energy requirements, which consequently determine the size of heating, cooling and energy generation equipment and in this way has an impact on investment costs. In addition to energy saving and investment cost reduction, a better insulated building provides other significant advantages, including higher thermal comfort because of warmer interior surface temperatures in winter and lower temperatures in summer. This also results in a lower risk of mold growth on internal surfaces.

As can be seen, an air barrier system and building insulation are essential components of the building envelope so that air pressure relationships within the building can be controlled, building HVAC systems can perform as intended, and the occupants can enjoy healthy indoor air quality and a comfortable environment, while reducing energy consumption. HVAC system size can be reduced because of a reduction in the added capacity to cover infiltration, energy loss and unknown factors, resulting in reduced energy use and demand. Air barrier and building insulation systems in a building envelope can also control concentrated condensation and the associated mold, corrosion, rot, and premature failure; and they also improve and promote durability and sustainability. Current building practices typically use a gypsum board or plywood sheathing over the exterior metal or wood framing. In the past, other types of sheathing made of pressed board, asphalt impregnated fiberboard, cement board, aluminum and polyethylene foil-faced foam board have been used over the exterior framing. However due to code requirements to use an air barrier over the exterior sheathing, only materials compatible with elastomeric coatings are being used as sheathing, such as gypsum board and plywood.

Gypsum sheathing has an advantage in that it is fire-resistant; however gypsum has very low insulating value. Gypsum sheathing with glass matt can only resist relatively low impact levels and fails to meet missile impact test requirements associated with coastal construction. Plywood and wood sheathing can meet missile impact test requirements; however, it also has very low insulating value. Both gypsum sheathing and wood sheathing are compatible with and can be coated by liquid applied elastomeric air barriers that meet building code compliance requirements. After plywood or wood sheathing is installed, the sheathing joints are taped and sealed. The exterior of the board is coated with an elastomeric air barrier membrane. Then, to meet code requirements of providing continuous insulation over the structural members, a layer of insulation board is installed. Plastic foam insulation provides good continuous insulation, but does not have any significant structural properties. Therefore, plastic foam insulation is attached over exterior sheathing. However, when this is done, the elastomeric air barrier membrane is penetrated. This can subject the air barrier to moisture and air infiltration and exfiltration risks. To mitigate this problem, aluminum foil insulating boards can be used over the exterior sheathing, such as Thermax polyisocyanurate aluminum foil faced insulation board by Dow Chemical. However, aluminum foil insulating boards have a vapor permeability rating of less than 0.04 Perms. Foil faced rigid board insulation provides a good vapor barrier, but cannot be used in climate zones and applications where the air barrier must be vapor permeable. While plastic foam boards are good insulators they have very poor fire resistance properties. Most plastic foam boards are combustible or melt under fire.

Once the building envelope is air tight, architectural wall claddings are installed on the exterior face of the exterior sheathing with the air barrier membrane and continuous plastic foam insulation on it. Stucco, brick, tile, stone, wood siding, metal panels, cement board and EIFS are popular types of exterior wall claddings. With the exception of EIFS, all of these wall claddings have to be mechanically attached to the structural framing members. The mechanical anchors penetrate the air barrier and the sheathing thereby increasing the risk of air infiltration and exfiltration.

Therefore, the new energy code compliant building envelope is comprised of several different materials and components manufactured by different companies and sold and installed by a number of different contractors. This process is labor intensive, time consuming and expensive. As a result, the cost of building an airtight and energy efficient building envelope has risen sharply over the past several years and will continue to rise.

To meet all of the above challenges in all climate zones and applications and to keep cost down, it would be desirable to provide an exterior sheathing product that has an air barrier membrane built into it. It also would be advantageous if the air barrier membrane properties could be adjusted to achieve any desired vapor permeability value; i.e., from a high vapor permeability rating to a low vapor permeable rating to a vapor impermeability rating. It would be desired for the air barrier sheathing to have insulating properties. It would also be desirable that the exterior insulating sheathing product is structurally sound and can resist the positive or negative structural loads that are imposed on a building by wind, stack effect, and HVAC fan pressures without rupture, displacement or undue deflection. It is desirable that these loads are safely transferred to the associated structure. It would be desirable that the exterior sheathing product has fire resistant properties. It would also be desirable that the exterior sheathing allows a wide variety of wall claddings to be attached to it without penetrating the air barrier. In essence the construction industry will benefit tremendously from a sheathing product that has build into it all of the above properties required by building codes. Such a sheathing product would eliminate the current use of multiple products and reduce labor, time and cost of installation.

SUMMARY OF THE INVENTION

The present invention satisfies the foregoing needs by providing an improved insulating system for structures, such as residential and commercial buildings.

In one disclosed embodiment, the present invention comprises a product. The product comprises a composite panel comprising a foam insulating panel having a first primary surface and an opposite second primary surface, and a first layer of a polymeric elastomeric material on the first primary surface such that at least a portion of a first layer of reinforcing material is at least partially embedded in the polymeric elastomeric material. The product also comprises a fastener for attaching the composite panel to a framing structure, wherein the fastener comprises a washer and wherein at least a portion of the first layer of a polymeric elastomeric material and at least a portion of the first layer of reinforcing material are disposed between the washer and the first primary surface. In another disclosed embodiment, the polymeric elastomeric material is a vapor permeable air barrier material.

In another disclosed embodiment, the present invention comprises a wall structure. The wall structure comprises a plurality of vertical studs horizontally spaced from each other to form a wall framing structure. The wall structure also comprises a composite panel comprising a foam insulating panel having a first primary surface and an opposite second primary surface, wherein the second primary surface is disposed adjacent the plurality of wall studs, and a first layer of a polymeric elastomeric material on the first primary surface such that at least a portion of a first layer of reinforcing material is at least partially embedded in the first layer of polymeric elastomeric material. The wall structure also comprises a plurality of fasteners for attaching the composite panel to the wall framing structure, wherein at least a portion of the first layer of a polymeric elastomeric material and at least a portion of the first layer of reinforcing material are disposed between each of the washers and the first primary surface. In another disclosed embodiment, the polymeric elastomeric material is a vapor permeable air barrier material.

In another disclosed embodiment, the present invention comprises a product. The product comprises a first composite panel comprising a first foam insulating panel having a first primary surface and an opposite second primary surface, and a first layer of a polymeric elastomeric vapor permeable air barrier material on the first primary surface of the first foam insulating panel such that at least a portion of a first layer of reinforcing material is at least partially embedded in the first layer of polymeric elastomeric vapor permeable air barrier material. The product also comprises a second composite panel disposed adjacent the first composite panel, the second composite panel comprising a second foam insulating panel having a first primary surface and an opposite second primary surface, and a second layer of a polymeric elastomeric vapor permeable air barrier material on the first primary surface of the second foam insulating panel such that at least a portion of a second layer of reinforcing material is at least partially embedded in the second layer of polymeric elastomeric vapor permeable air barrier material. The product also comprises a fastener for attaching the first and second composite panels to a framing structure, wherein the fastener comprises a washer and wherein at least a portion of the first layer of reinforcing material is disposed between the washer and the first primary surface of the first foam insulating panel and at least a portion of the second layer of reinforcing material is disposed between the washer and the first primary surface of the second foam insulating panel. In another disclosed embodiment, the product also comprises an elastomeric vapor permeable air barrier membrane on the first primary surface of both the first and second foam insulating panels such that at least a portion of the first and second layers of reinforcing material are at least partially embedded in the elastomeric vapor permeable air barrier membrane.

Accordingly, it is an object of the present invention to provide an improved insulating system.

Another object of the present inventions is to provide an insulating board that is vapor permeable but prevents air leakage through a building envelope.

Another object of the present inventions is to provide a reinforced foam panel and sheathing material with improved insulating and fire resistance properties.

Another object of the present inventions is to provide a reinforced foam panel and sheathing material with improved structural properties.

Another object of the present inventions is to provide a reinforced foam panel and sheathing material with improved insulating and fire resistance properties Another object of the present invention is to provide a reinforced foam panel with improved properties that can be used as a substrate for exterior wall claddings Another object of the present invention is to provide insulated foam sheathing for use in insulating structures, such as residential and commercial buildings.

Another object of the present invention is to provide insulated foam sheathing for use in insulating walls.

Another object of the present invention is to provide insulated foam sheathing for use in insulating roofs.

Another object of the present invention is to provide an improved method for insulating structures, such as residential and commercial buildings.

A further object of the present invention is to provide a more efficient way of insulating structures, such as residential and commercial buildings.

Another object of the present invention is to provide an improved system for attaching foam sheathing panels to a building structure.

Another object of the present invention is to provide an improved insulated sheathing system in which the vapor permeability can be varied; i.e., increased or decreased.

These and other objects, features and advantages of the present invention will become apparent after a review of the following detailed description of the disclosed embodiments and the appended drawing and claims.

BRIEF DESCRIPTION OF THE DRAWINGS

FIG. 12 is another disclosed embodiment of a composite insulated panel in accordance with the present invention.

FIG. 13 is a cross-sectional view taken along the line 13-13 of the composite insulated panel shown in FIG. 12.

DETAILED DESCRIPTION OF THE DISCLOSED EMBODIMENTS

Figure 1:
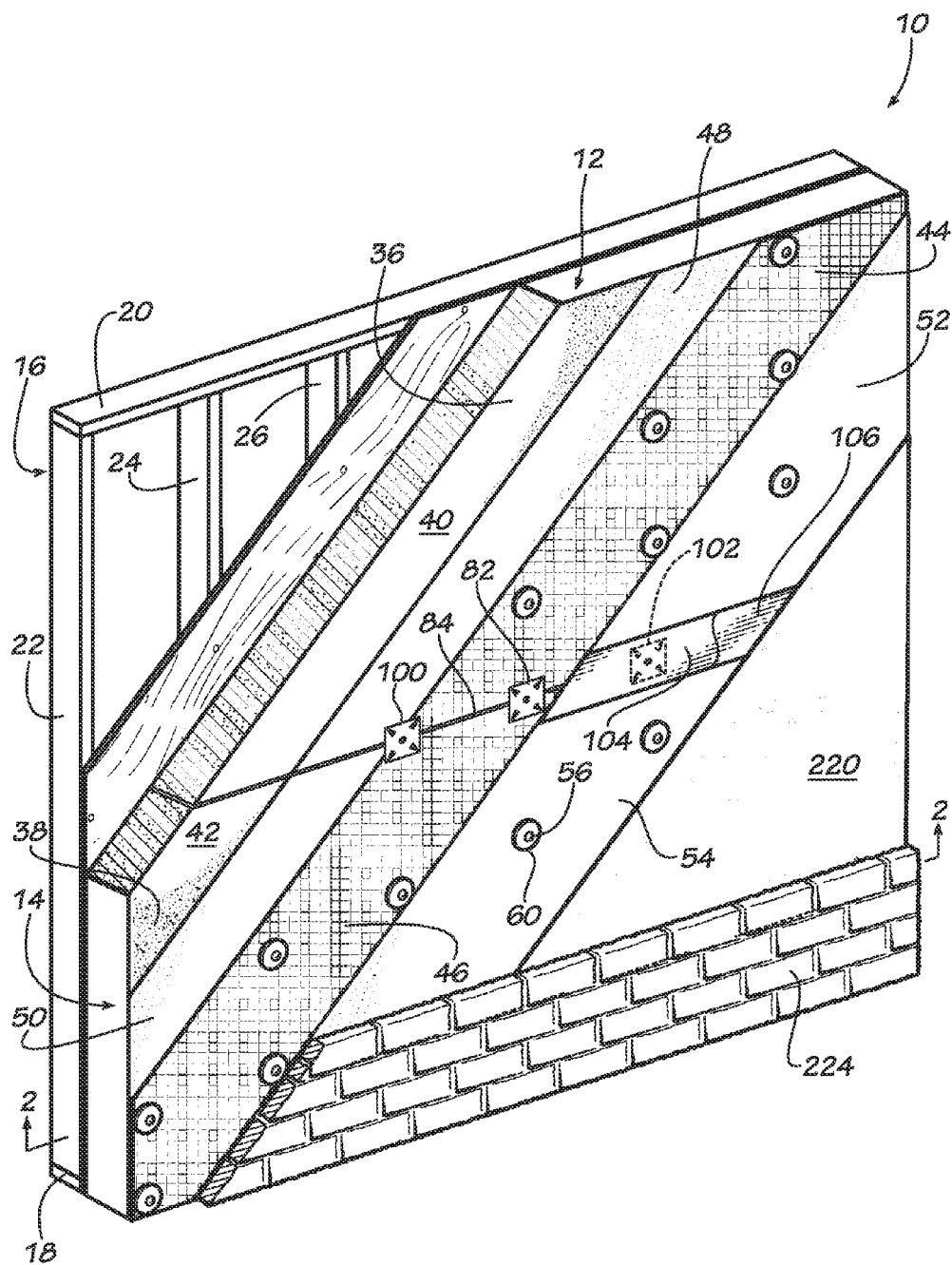
FIG. 1 is a partially cut away perspective view of a disclosed embodiment of an insulated wall sheathing system in accordance with the present invention.

Referring now to the drawing in which like numbers indicate like elements throughout the several views, there is shown in FIG. 1 a disclosed embodiment of an insulated sheathing system 10 in accordance with the present invention. The insulated sheathing system 10 includes a first composite insulated panel 12 and a second composite insulated panel 14 attached to a conventional stud wall 16. The stud wall 16 comprises a horizontal bottom track 18 and a horizontal top track 20. Disposed between the bottom track 18 and the top track 20 are a plurality of vertical studs 22, 24, 26, 28, 30, 31, 32. The vertical studs 22-32 are typically made from 2"×4" or 2"×6" pine and usually in lengths of 8 feet, 9 feet or 10 feet. The vertical studs 22-32 shown in FIG. 1 are 2"×4"×8'. Although the vertical studs 22-32 are shown as being made from wood, other materials including, but not limited to, metal or composite materials can be used for the vertical studs.

Each of the composite insulated panels 12, 14 comprises a rectangular foam insulating panel 36, 38. The foam insulating panels 36, 38 can be made from any thermal insulating material that is sufficiently rigid to withstand anticipated wind loads. The foam insulating panels 36, 38 preferably are made from a polymeric foam material, such as molded expanded polystyrene foam or extruded polystyrene foam. Other polymeric foams can also be used including, but nor limited to, polyisocyanurate and polyurethane. If the foam insulating panels 36, 38 are made from expanded polystyrene foam, the foam insulated panels a should be at least 1 inch thick, preferably between 2 and 8 inches thick, especially at least 2 inches thick; more especially at least 3 inches thick, most especially at least 4 inches thick. If the foam insulating panels 36, 38 are made from a material other than polystyrene, the foam insulating panels should have insulating properties equivalent to at least 1 inch of expanded polystyrene foam, preferably between 2 and 8 inches of expanded polystyrene foam, especially at least 2 inches of expanded polystyrene foam; more especially at least 3 inches of expanded polystyrene foam, most especially at least 4 inches of expanded polystyrene foam.

The foam insulating panels 36, 38 should also have a density sufficient to make them substantially rigid, such as approximately 1 to approximately 3 pounds per cubic foot, preferably approximately 1.5 pounds per cubic foot. High density expanded polystyrene is available under the trademark Neopor® and is available from Georgia Foam, Gainesville, Ga. The foam insulating panels 36, 38 can be made by molding to the desired size and shape, by cutting blocks or sheets of pre-formed expanded polystyrene foam into a desired size and shape or by extruding the foam in a desired shape and then cutting the foam to a desired length. Although the foam insulating panels 36, 38 can be of any desired size and thickness, it is specifically contemplated that the foam insulating panels will conveniently be 4 feet wide and 8 feet long, 4 feet wide and 10 feet long or 4 feet wide and 12 feet long and 4 inches thick.

Applied to the exterior surface (a first primary surface) 40, 42 of each of the foam insulating panel 36, 38, respectively, is a layer of reinforcing material 44, 46, respectively. The layers of reinforcing material 44, 46 make the foam insulating panels 36, 38 more rigid, allow for embedment and gauge the thickness of the elastomeric air barrier. They can also assist in attaching the foam insulating panels to a building structure and attaching exterior finishes to the foam insulating panels. The layers of reinforcing material 44, 46 are made from porous materials, such as woven and nonwoven materials. As used herein the term "porous material" does not include metal screens, metal meshes, metal grids and other similar structures. To achieve a vapor permeability rating, the layers of reinforcing material 44, 46 specifically are not made from continuous materials, such as films, foils, metal sheets and other similar nonporous materials.

Nonwoven fabrics are broadly defined as sheet or web structures bonded together by entangling fiber or filaments (and by perforating films) mechanically, thermally or chemically. They are flat or tufted porous sheets that are made directly from separate fibers, molten plastic or plastic film. They are not made by weaving or knitting and do not require converting the fibers to yarn. Nonwoven fabrics provide specific functions such as liquid repellence, strength, flame retardancy, thermal insulation, acoustic insulation, and filtration. Nonwovens are typically manufactured by putting small fibers together in the form of a sheet or web (similar to paper on a paper machine), and then binding them either mechanically (as in the case of felt, by interlocking them with serrated needles such that the inter-fiber friction results in a stronger fabric), with an adhesive, or thermally (by applying binder in the form of powder, paste, or polymer melt and melting the binder onto the web by increasing temperature).

Staple nonwovens are made in four steps. Fibers are first spun, cut to a few centimeters in length, and put into bales. The staple fibers are then blended, "opened" in a multistep process, dispersed on a conveyor belt, and spread in a uniform web by a wetlaid, airlaid, or carding/crosslapping process. Wetlaid operations typically use ¼" to ¾" long fibers, but sometimes longer if the fiber is stiff or thick. Airlaid processing generally uses 0.5" to 4.0" fibers. Carding operations typically use ~1.5" long fibers. Rayon used to be a common fiber in nonwovens, now greatly replaced by polyethylene terephthalate (PET) and polypropylene (PP). Fiberglass is wetlaid into mats. Synthetic fiber blends are wetlaid along with cellulose. Staple nonwovens are bonded either thermally or by using resin. Bonding can be throughout the web by resin saturation or overall thermal bonding or in a distinct pattern via resin printing or thermal spot bonding. Conforming with staple fibers usually refers to a combination with meltblown. Meltblown nonwovens are produced by extruding melted polymer fibers through a spinneret or die consisting of up to 40 holes per inch to form long thin fibers which are stretched and cooled by passing hot air over the fibers as they fall from the die. The resulting web is collected into rolls and subsequently converted to finished products. The extremely fine fibers (typically polypropylene) differ from other extrusions, particularly spun bond, in that they have low intrinsic strength but much smaller size offering key properties. Often meltblown fibers are added to spun bond fibers to form SM or SMS webs, which are strong and offer the intrinsic benefits of fine fibers, such as acoustic insulation.

Nonwovens can also start with films and fibrillate, serrate or vacuum-form them with patterned holes. Fiberglass nonwovens are of two basic types. Wet laid mat or "glass tissue" use wet-chopped, heavy denier fibers in the 6 to 20 micrometer diameter range. Flame attenuated mats or "batts" use discontinuous fine denier fibers in the 0.1 to 6 range. The latter is similar, though run at much higher temperatures, to meltblown thermoplastic nonwovens. Wet laid mat is typically wet resin bonded with a curtain coater, while batts are usually spray bonded with wet or dry resin. An unusual process produces polyethylene fibrils in a Freon-like fluid, forming them into a paper-like product and then calendering them to create Tyvek®.

Both staple and spunlaid nonwovens would have no mechanical resistance in and of themselves, without the bonding step. Several methods can be used: thermal bonding, heat sealing using a large oven for curing, calendering through heated rollers (called spunbond when combined with spunlaid webs), calenders can be smooth faced for an overall bond or patterned for a softer, more tear resistant bond, hydroentanglement (mechanical intertwining of fibers by water jets, often called spunlace), ultrasonic pattern bonding, needlepunching/needlefelting (mechanical intertwining of fibers by needles), and chemical bonding (wetlaid process—use of binders, such as latex emulsion or solution polymers, to chemically join the fibers, meltblown (fibers are bonded as air attenuated fibers intertangle with themselves during simultaneous fiber and web formation). Synthetic fabrics are man-made textiles rather than natural fibers. Some examples of synthetic fabrics are polyester, acrylic, nylon, rayon, acetate, spandex, lastex (yarn made from a core of latex rubber covered with fabric strands) and Kevlar® (aramid fibers). Synthetic fibers are made by the joining of monomers into polymers, by the process of polymerization. The fabric is made from chemically produced fibers. The chemicals are in liquid form and are forced through tiny holes called spinnerets. As the liquid comes out of the spinnerets and into the air, it cools and forms into tiny threads.

The layers of reinforcing material 44, 46 are preferably porous fabrics, webs or meshes, such as nonwoven plastic sheets for example a nonwoven polyester or a nonwoven fiberglass matt, or a woven or nonwoven fiberglass mesh or grid. The layers of reinforcing material 44, 46 can be made from materials such as polymer fibers, for example polyethylene, polystyrene, vinyl, polyvinyl chloride (PVC), polypropylene or nylon, from fibers, such as fiberglass, basalt fibers, and aramid fibers or from composite materials, such as carbon fibers in polymeric materials (but not metal wire meshes or metal wire grids). Nonwoven fiber meshes and grids are available from Chomarat North America, Anderson, S.C., USA. An especially preferred material for use as the layers of reinforcing material 44, 46 is a commercially available product designated as PermaLath® non-metallic, self-furring lath from BASF, Cleveland, Ohio, USA and also disclosed in U.S. Pat. Nos. 7,625,827 and 7,902,092 (the disclosures of which are both incorporated herein by reference in their entirety). The layers of reinforcing material 44, 46 also can be made from the mesh (or lath) disclosed in any of U.S. Pat. Nos. 5,836,715; 6,123,879; 6,263,629; 6,454,889; 6,632,309; 6,898,908 or 7,100,336 (the disclosures of which are all incorporated herein by reference in their entirety). A particularly preferred material for the layers of reinforcing material 44, 46 is a woven fiberglass mesh, a woven fiberglass fabric and a nonwoven fiberglass matt available from JPS Composite Materials, Anderson, S.C., USA.

The layers of reinforcing material 44, 46 are adhered to the exterior surfaces 40, 42 of the foam insulating panels 36, 38, respectively. It is preferred that the layers of reinforcing material 44, 46 be laminated to the exterior surfaces 40, 42 of the foam insulating panel 36, 38 using a polymeric elastomeric material that forms an air barrier on the exterior surface of the foam insulating panels, but also allows a desired amount of vapor permeability, but does not allow air transmission. The vapor permeable air barrier layers 48, 50 can be applied to the exterior surfaces 40, 42 of the foam insulating panels 36, 38, respectively, by any suitable method, such as by spraying, brushing or rolling, and then applying the layers of reinforcing material 44, 46 thereto. Alternately, the layers of reinforcing material 44, 46 can be applied to the exterior surfaces 40, 42 of the foam insulating panels 36, 38, respectively, and then the vapor permeable air barrier layers 52, 54 can be applied to the layers of reinforcing material by any suitable method, such as by spraying, brushing or rolling Preferably, the elastomeric vapor permeable air barrier layers 48, 50 can be applied to the exterior surfaces 40, 42 of the foam insulating panels 36, 38, respectively, and then the layers of reinforcing material 44, 46 can be applied to the elastomeric vapor permeable air barrier layers 51, 54 followed by the vapor permeable air barrier layers 52, 54 applied to the layers of reinforcing material. The elastomeric vapor permeable air barrier layers 48, 50 can be applied as the laminating agent for the layers of reinforcing material 44, 46 or it can be applied in addition to an adhesive used to adhere the layer of reinforcing material to the exterior surfaces 40, 42 of the foam insulating panels 36, 38. Preferably, the layers of reinforcing material 40, 42 are at least partially embedded in the elastomeric vapor permeable air barrier layers 48-54. Suitable polymeric materials for use as the vapor permeable air barrier layers 48-54 are any water-resistant polymeric material that is compatible with both the material from which the layer of reinforcing material 44, 46 and the foam insulating panel 36, 38 are made; especially, liquid applied polymeric elastomeric vapor permeable air barrier membrane materials.

A preferred vapor permeable air barrier membrane 48-54 is made from a combination of the liquid vapor permeable air barrier membrane material, such as a polymeric elastomeric coating, and 0.1% to approximately 50% by weight ceramic fibers, preferably 0.1% to 40% by weight, more preferably 0.1% to 30% by weight, most preferably 0.1% to 20% by weight, especially 0.1% to 15% by weight, more especially 0.1% to 10% by weight, most especially 0.1% to 5% by weight. Ceramic fibers are fibers made from materials including, but not limited to, silica, silicon carbide, alumina, aluminum silicate, aluminum oxide, zirconia, and calcium silicate. Wollastonite is an example of a ceramic fiber. Wollastonite is a calcium inosilicate mineral ($CaSiO_3$) that may contain small amounts of iron, magnesium, and manganese substituted for calcium. Wollastonite is available from NYCO Minerals of NY, USA. Bulk ceramic fibers are available from Unifrax I LLC, Niagara Falls, N.Y., USA. Ceramic fibers are known to block heat transmission and especially radiant heat. When placed on the exterior surface of a wall, ceramic fibers improve the energy efficiency of the building envelope.

Optionally, Wollastonite, other mineral oxides, such as magnesium oxide and aluminum oxide, fly ash, rice husk ash or fire clay or any other fire resistant fillers, can be added to the vapor permeable air barrier membrane material, in the above mentioned quantities, to both increase resistance to heat transmission, improve radiant heat insulation properties and act as a fire retardant. Therefore, the elastomeric vapor permeable air barrier materials can obtain fire resistance properties. A fire resistant vapor permeable air barrier membrane over the exterior surface of the foam insulating panel can increase the fire rating of the wall assembly and delay the melting of the foam insulating panels.

Preferably, the vapor permeable air barrier layers 48, 50 and/or 52, 54 are water resistant. Vapor permeable weather and air barriers have to allow the desired amount of vapor transmission under pressure differential but have to stop the water infiltration into the building envelope. It is also preferred that the air barrier layers 48, 50 and/or 52, 54 are vapor permeable. Thus, the vapor permeable air barrier layers 48, 50 and/or 52, 54 provide an air barrier, but not a vapor barrier. The vapor permeable air barrier layers 48, 50 and/or 52, 54 preferably have a water vapor transmission rating of at least 1 perm (1.0 US perm=1.0 grain/square-foot·hour·inch of mercury≈57 SI perm=57 ng/s·m2·Pa) (ASTM E96), preferably at least 5 perms, more preferably at least 10 perms. The vapor permeable air barrier layers 48, 50 and/or 52, 54 should have a minimum of 200% elongation factor, and an air permeance of less than 0.004 cfm/sq. ft. under a pressure differential of 0.3 in. water (1.57 psf) (equal to 0.02 L/s.×sq. m. @ 75 Pa). Air permeance is measure in accordance with ASTM E2178. The composite insulated panels 12, 14 should have an assembly air permeance of less than 0.04 cfm/sq. ft. of surface area under a pressure differential of 0.3 in. water (1.57 psf) (equal to 0.2 L/s.×sq. m. of surface area at 75 Pa) when tested in accordance with ASTM E2357. The vapor permeable air barrier layers 48, 50 and/or 52, 54 can be latex, elastomeric, acrylic, and may or may not have fire resistive properties. Air permeance is the amount of air that migrates through a material. Useful liquid applied weather membrane materials include, but are not limited to, Air-Shield LMP by W.R. Meadows, Cartersville, Ga., USA, (a vinyl acetate and ethylene glycol monobutyl ether acetate water-based air/liquid elastomeric vapor permeable air barrier that cures to form a tough, seamless, elastomeric membrane); Perm-A-Barrier VP 20 by Grace Construction Products, W.R. Grace & Co. (a fire-resistive, one component, fluid-applied elastomeric vapor permeable air barrier membrane that protects building envelope from air leakage and rain penetration, but allow the walls to "breathe"); and Tyvek Fluid Applied WB System by E.I. du Pont de Nemours and Company, Wilmington, Del., USA (a fluid applied weather barrier, vapor permeable system). Air-Shield LMP has an air permeability of <0.04 cfm/ft$^2$ @ 75 Pa (1.57 lbs/ft$^2$) (ASTM E2357), an air permeability of <0.004 cfm/ft2 @ 75 Pa (1.57 lbs/ft2) (ASTM E2178), water vapor permeance of 12 perms (ASTM E96) and an elongation of 1000% (ASTM D412). Perm-A-Barrier VP 20 has an air permeance of <0.0006 cfm/ft$^2$ @ 1.57 psf (0.003 L/s·m$^2$ @ 75 Pa) (ASTM E2178).

Figure 3:
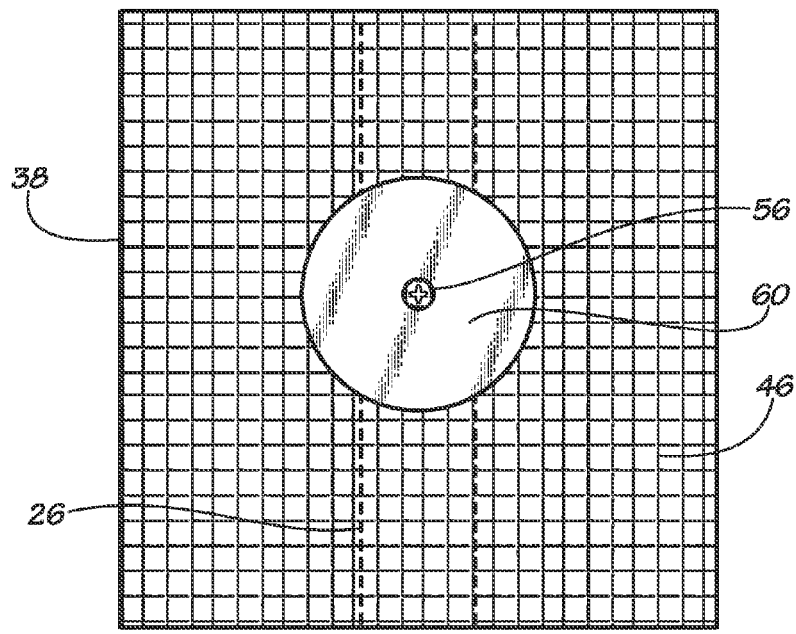
FIG. 3 is a partial detailed plan view of the exterior surface of a composite insulated panel shown in FIG. 1 showing a layer of reinforcing material at least partially disposed under a washer and a screw for attaching the composite insulated panel to a building structure.
Figure 4:
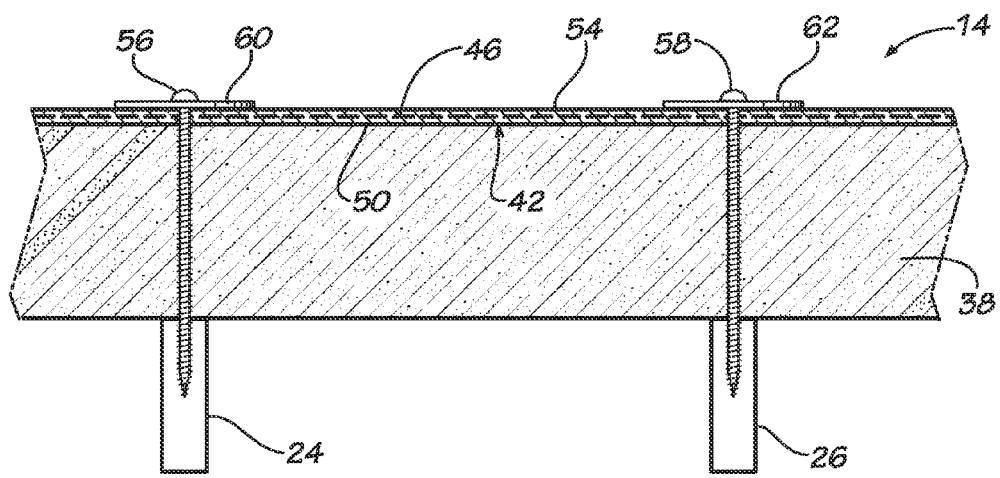
FIG. 4 is a partial cross-sectional view of an alternate disclosed embodiment of the insulated wall sheathing system in accordance with the present invention.

The composite insulated panels 12, 14 therefore comprise the foam insulating panels 36, 38, the attached layers of reinforcing material 44, 50 and the associated elastomeric vapor permeable air barrier layers 48, 50 and/or 52, 54, respectively. The composite insulated panels 12, 14 are attached to the vertical studs 22-32 by a plurality of screws vertically and horizontally spaced from each other, such as by the screws 56, 58 and associated washers, such as the circular washers 60, 62 (FIGS. 3 and 4). The washers 60, 62 can be made from plastic or preferably are made from metal. As can be seen in FIGS. 3 and 4, at least a portion of the layer of reinforcing material 46 is disposed between the washers 60, 62 and the exterior primary surface 46 of the foam insulating panel 38. To achieve effective structural properties and to resist the positive or negative structural loads that are imposed on the panels 12 and 14 by wind, stack effect, and HVAC fan pressures without rupture, displacement or undue deflection and for the load to be safely transferred to the structure, the screws 56, 58 penetrate through the elastomeric vapor permeable air barrier layers 38 and/or 54, through the layer of reinforcing material 46, through the foam insulating panel 38 and into the studs 24, 26. By capturing the layer of reinforcing material 46 between the exterior surface 42 of the foam insulating panel 38 and each of the washers 60, 62, the structural loads exerted on the foam insulating panel are distributed over a wider area than just the area of the washer; it is also at least partially transferred to the layer of reinforcing material. Notably, none of the layer of reinforcing material 46 covers the screws 56, 58 and the associated washers 60, 62. Such would be counterproductive to the principle of transferring the retaining force of the screws 56, 58 and the associated washers 60, 62 to the layer of reinforcing material 46. Without the screws 56, 58 and the associated washers 60, 62 over the reinforcing material 44, 50 the foam panel will fail. Also, the composite foam panel with an elastomeric coating and laminated fiber reinforced porous material creates a structurally strong foam panel that can resist the structural loads associated with the exterior of a building. A foam panel laminated with films or foils, such as polyethylene film or an aluminum foil, are not as strong as a foam insulating panel laminated with a fiberglass grid or mesh and elastomeric vapor permeable air barrier membrane in accordance with the present invention.

Figure 2:
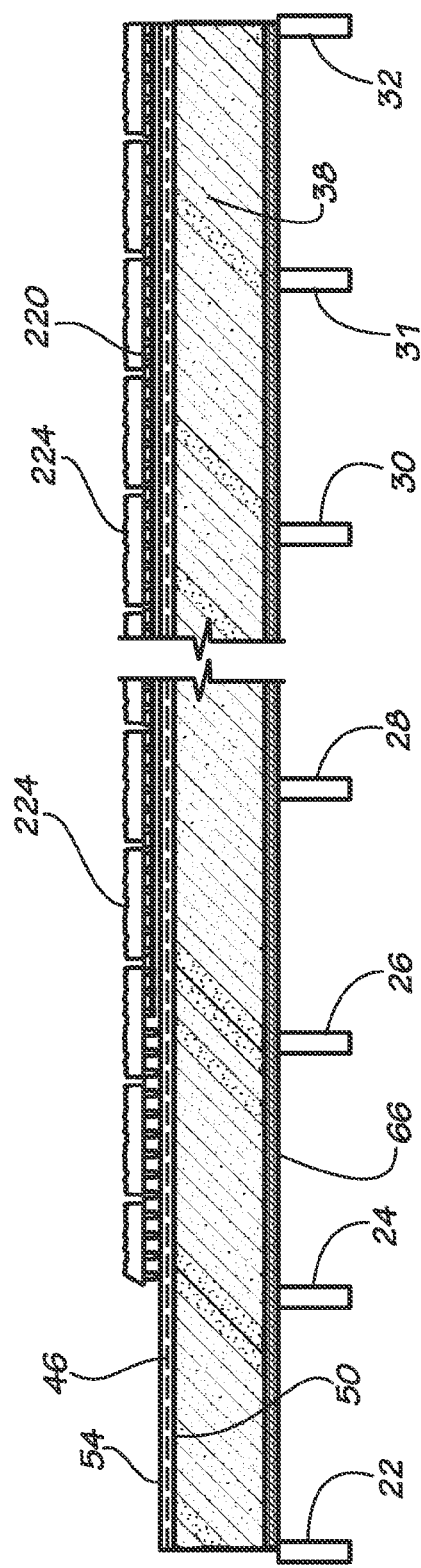
FIG. 2 is a partial cross-sectional view taken along the line 2-2 of the wall sheathing system shown in FIG. 1.
Figure 5:
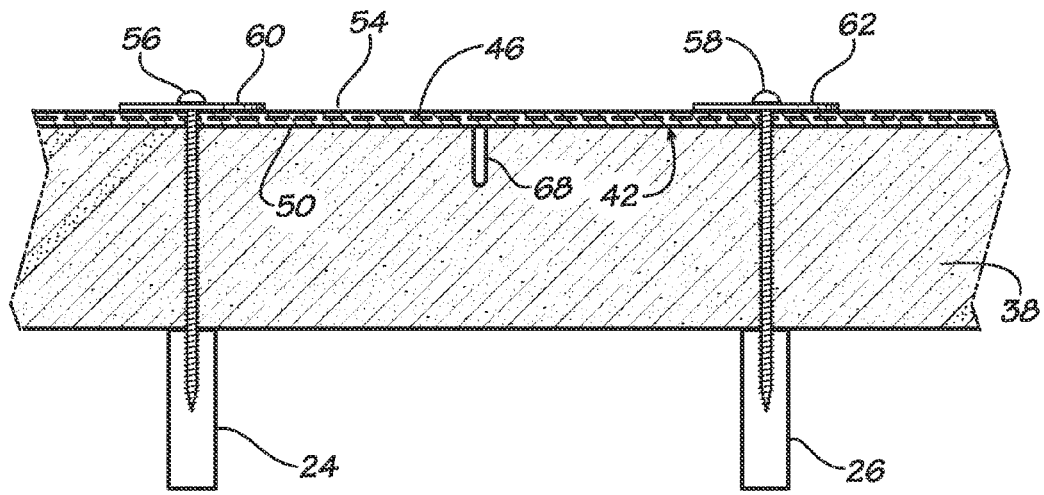
FIG. 5 is a partial cross-sectional view of an alternate disclosed embodiment of the insulated wall sheathing system in accordance with the present invention.
Figure 6:
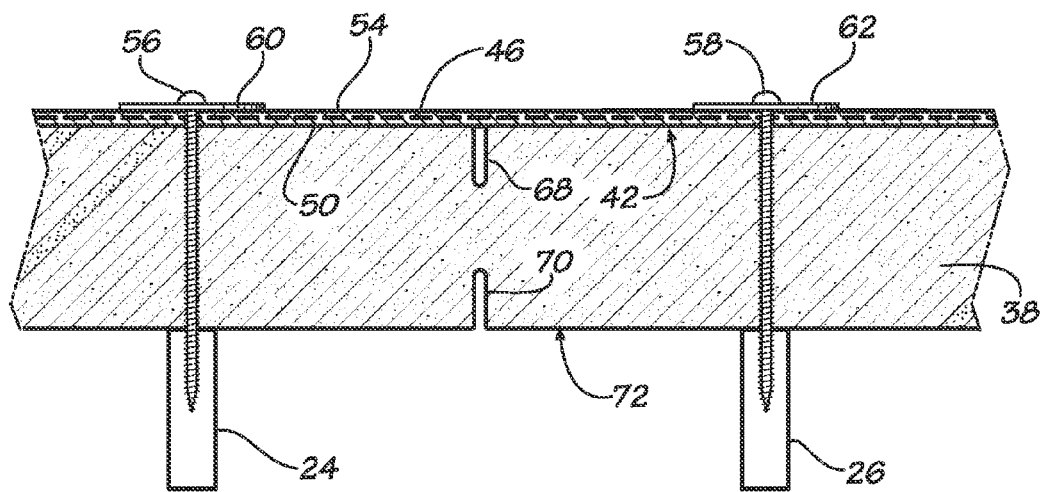
FIG. 6 is a partial cross-sectional view of an alternate disclosed embodiment of the insulated wall sheathing system in accordance with the present invention.

FIGS. 4, 5 and 6 show the composite insulated panel 14 attached directly to the studs 24, 26. However, a layer of plywood sheeting, such as the plywood sheets 64, 66, optionally can be disposed between the composite insulated panels 12, 14 and the studs 22-32 as shown in FIGS. 1 and 2.

FIGS. 5-8 show alternate disclosed embodiments of the composite insulated panel shown in FIG. 4. In order to achieve various structural properties, one or both sides of the foam insulating panel can be laminated with the layer of reinforcing material and polymeric elastomeric vapor permeable air barrier membrane. As shown in FIG. 5, the foam insulating panel 38 includes a plurality of transverse channels, such as the channel 68, formed in the exterior surface 42 of the foam insulating panel. The channels, such as the channel 68, are formed at longitudinally spaced intervals, such as at 16 inch intervals, and extending transversely (vertically as seen in FIG. 1) across the width of the foam insulating panel. The channels, such as the channel 68, provide for thermal expansion stress relief of the foam insulating panel 38. The channels, such as the channel 68, can be formed in the foam insulating panels, such as in the foam insulating panel 38, by a router, hot knife or hot wire.

As shown in FIG. 6, channels, such as the channels 68, 70, are formed in both the exterior surface 42 and the interior surface 72 of the foam insulating panel 38.

Figure 7:
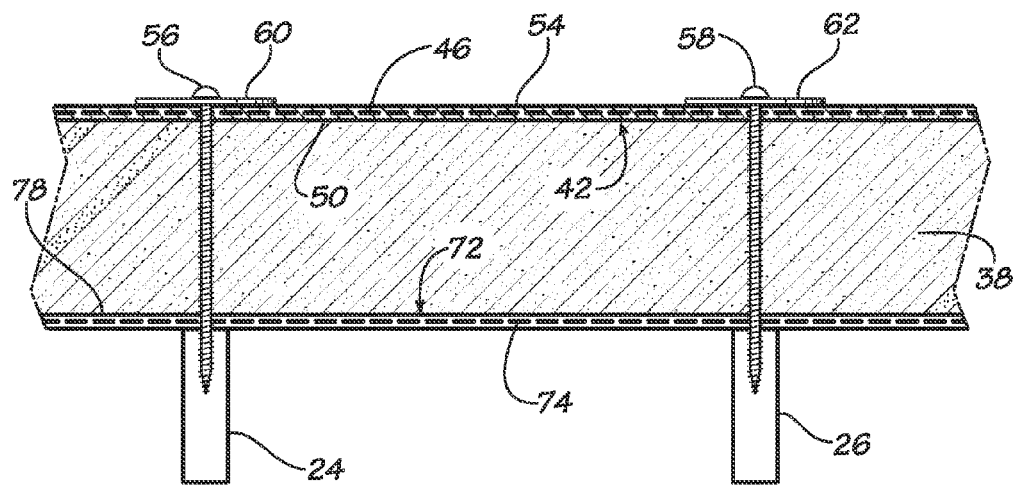
FIG. 7 is a partial cross-sectional view of an alternate disclosed embodiment of the insulated wall sheathing system in accordance with the present invention.

In FIG. 7, layers of reinforcing material 46, 74 are shown on both the exterior surface 46 and the interior surface 72, respectively, of the foam insulating panel 38. That is, a layer of reinforcing material 46 and the elastomeric vapor permeable air barrier layers 50, 54 are disposed on the exterior surface 42 of the foam insulating panel 38 and an identical layer of reinforcing material 74 and elastomeric vapor permeable air barrier layers 76, 78 are disposed on the interior surface 72 of the foam insulating panel. Alternatively, the interior layer of reinforcing material 74 and associated elastomeric vapor permeable air barrier layers 76, 78 can also be made from other suitable types of material then those used for the layer of reinforcing material 46 and the elastomeric vapor permeable air barrier layers 50, 54. When laminating both sides of the foam insulating panel with the layers of reinforcing material and laminating agent, the composite foam insulated panel can withstand greater structural loads than when only one side is laminated.

Figure 8:
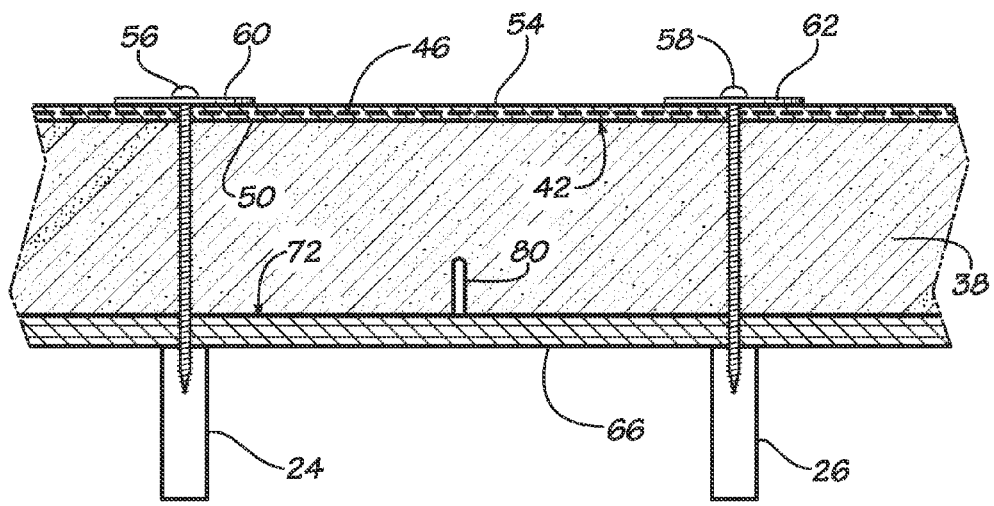
FIG. 8 is a partial cross-sectional view of an alternate disclosed embodiment of the insulated wall sheathing system in accordance with the present invention.

In FIG. 8, a plywood or gypsum sheathing member 66 is disposed between the foam insulating panel 38 and the studs 24, 26 as a structural support for the foam insulating panel. The foam insulating panel 38 includes a plurality of transverse channels, such as the channel 80, formed in the interior surface 72 of the foam insulating panel. The channels, such as the channel 80, are formed at longitudinally spaced intervals, such as at 16 inch intervals, and extending transversely (vertically as seen in FIG. 1) across the width of the foam insulating panel 38.

Figure 9:
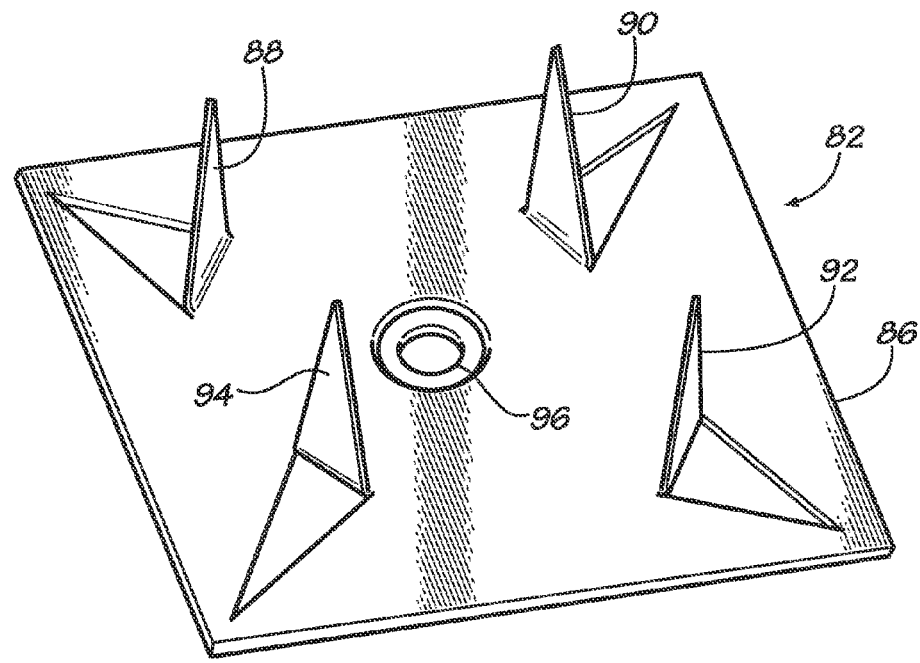
FIG. 9 is a perspective view of a disclosed embodiment of a washer for use in attaching the composite insulated foam panels to a building structure in accordance with the present invention.
Figure 10:
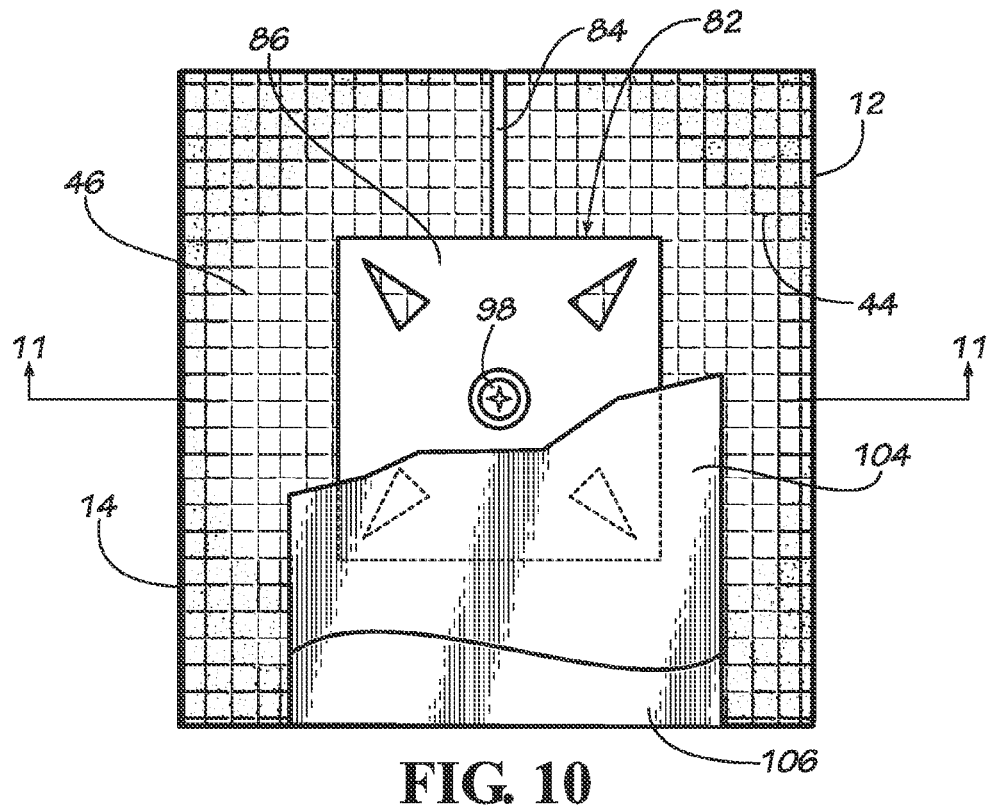
FIG. 10 is a partial plan view of the washer shown in FIG. 9 attaching two adjacent composite insulated panels in accordance with the present invention.
Figure 11:
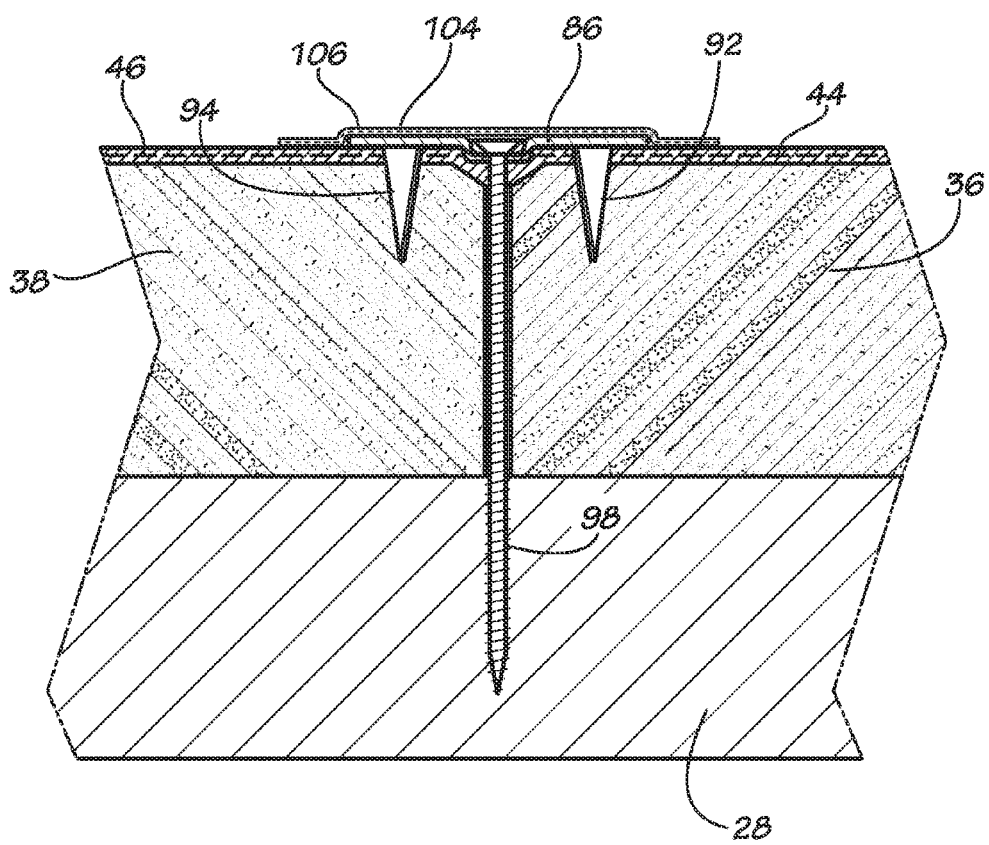
FIG. 11 is a partial cross-sectional view taken along the line 11-11 of the washer and composited insulted panels shown in FIG. 10.

FIGS. 9-11 is a disclosed alternate embodiment of a washer 82 to use in lieu of the flat washer 60 described above. The washer 82 is especially useful at the joint or seam 84 formed between the composite insulated panel 12 and the composite insulated panel 14. The washer 82 is shown as being square, but can be any suitable shape, such as round, octagonal or the like. The washer 82 comprises a flat body member 86 and four claws or cleats 88, 90, 92, 94 extending outwardly from the body member. The cleats 88-94 are triangular in shape and can be conveniently formed by punching or stamping. However, the shape of the cleats can be any suitable shape, such as square or round. The washer 82 is preferably made from metal, but can also be made from plastic or a composite material. A hole 96 for a screw 98 is formed in the center of the washer 82.

The washer 82 is applied to the composite insulated panels 12, 14 so that the washer straddles the seam 84 between the composite insulated panels and the cleats 88-94 penetrate through the layers of reinforcing material 44, 46 and into the foam insulating panels 36, 38 (FIG. 11). The screw 98 extends between the adjacent foam insulating panels 36, 38 and into the stud 26. Since the cleats 90, 92 are anchored in the composite insulated panel 12 through the layers of reinforcing material 44 and the cleats 88, 94 are anchored in the composite insulated panel 14 through the layers of reinforcing material 46, the washer 82 securely holds the two composite insulated panels 12, 14 together. Exterior sheathing can be subjected to significant amounts of negative pressures and positive wind forces, thermal stresses and movement. The washer 82 with the cleats 88-94 better secures the composite insulated panels 12, 14 to the stud frame 16. Therefore, by attaching the washer 82 to the stud frame 16, the washer improves the structural properties of the composite insulated panel 12, 14 under various stresses. By tightly holding the two composite insulated panels 12, 14 together, air infiltration between the panels is reduced or prevented. A plurality of washers, such as washers 100, 102, identical to the washer 82 are disposed along the length of the seam 84 (FIG. 1). Alternatively, the washer 82 can be used in place of the washers 60, 62.

After the washers 82, 100, 102 are anchored to the studs, such as the stud 28, a strip of reinforcing material 104 is applied over the seam 84 between the adjacent composite insulated panels 12, 14 and over the washers (FIGS. 1, 10 and 11). The strip of reinforcing material 104 is made from the same material as the layers of reinforcing material 44, 46 or any other type of compatible material. The strip of reinforcing material 104 extends the length of the composite insulated panels 12, 14 and is wide enough to completely cover the washers 82, 100, 102 (FIGS. 1, 10 and 11). The strip of reinforcing material 104 is adhered to the composite insulated panels 12, 14 preferably by applying to the strip of reinforcing material an elastomeric vapor permeable air barrier layer 106 made from the same material as the elastomeric vapor permeable air barrier layers 48, 50 and/or 52, 54 so that the strip of reinforcing material is at least partially embedded in the elastomeric vapor permeable air barrier layer 106 (FIG. 11). This provides an elastomeric vapor permeable air barrier over the seam 84 between the adjacent composite insulated panels 12, 14 (FIGS. 10 and 11). However, a conventional water resistant adhesive can also be used to adhere the strip of reinforcing material 104 to the composite insulated panels 12, 14.

Extruded polystyrene foam boards have a vapor permeability of approximately 1 Perm. Expanded polystyrene foam boards have a vapor permeability of approximately 3.5 Perms. Other types of foam boards have lower vapor permeabilities. In many cases, it is desirable to increase the vapor permeability of the insulating foam board. To increase the vapor permeability of the foam board perforation can be made in the foam panel. By laminating the reinforcing material over the perforations the foam board does not loose any of it physical properties.

FIGS. 12 and 13 show another disclosed embodiment for the composite insulated foam panel 200 which can be used in place of the composite insulated foam panels 12, 14. The composite insulated foam panel 200 comprises a foam insulating panel 202 made from the same material as the foam insulating panels 36, 38. The composite insulated foam panel 200 also comprises a layer of reinforcing material 204 adhered to the foam insulating panel 202 by an elastomeric vapor permeable air barrier layer 206 and/or an elastomeric vapor permeable air barrier layer 208. It is specifically contemplated that either the elastomeric vapor permeable air barrier layer 206 or the elastomeric vapor permeable air barrier layer 208 or both may be present depending on the method of application, the viscosity of the elastomeric vapor permeable air barrier layer and/or the porosity of the layer of reinforcing material 204. The layer of reinforcing material 204 is made from the same material as the layers of reinforcing material 44, 46. And, the elastomeric vapor permeable air barrier layers 206, 208 are made from the same material as the elastomeric vapor permeable air barrier layers 48, 50 and/or 52, 54. The difference between the composite insulated foam panel 200 and the composite insulated foam panels 12, 14 is that the foam insulating panel 202 includes a plurality of holes, such as the holes 210, 212, 214, 215, that are spaced vertically and horizontally from each other. The holes, such as the holes 210-215, extend from the exterior surface 216 of the foam insulating panel 202 to the interior surface 218 thereof. The holes 210-215 provide channels for water vapor to pass more freely from the interior to the exterior of the foam insulating panel 202. The elastomeric vapor permeable air barrier layers 206 and/or 208 cover the holes 210-215 on the exterior surface 216 of the foam insulating panel 202 and provide an elastomeric vapor permeable air barrier therefor. The number of holes, such as the holed 210-215, can be increased or decreased to increase or decrease the vapor permeability of the foam insulating panel 202.

Optionally, to increase their rigidity and structural properties, the composite insulated panels 12, 14 include a layer of cementitious material 220. The layer of cementitious material 220 is applied to the layers of reinforcing material 44, 46 and/or to the elastomeric vapor permeable air barrier layers 52, 54. The layer of cementitious material 220 is applied in any desired thickness. However, the layer of cementitious material 220 is usually applied in a thickness of 1/16 inch to 1 inch, preferably 1/8 inch to 1/2 inch. Additionally, the thickness and composition of the cementitious layer 220 can be adjusted to increase or decrease the vapor permeability of the cementitious layer. The layer thickness and composition of the layer of cementitious material can also be adjusted to increase the fire resistance of the composite insulated panel.

In an alternate disclosed embodiment, in FIGS. 12 and 13, the composite insulated foam panel 200 includes a layer of cementitious material 222. The layer of cementitious material 222 is made from the same material as the layer of cementitious material 220. It is specifically contemplated that the foam insulating panel 202, with or without the holes 210-215, with the layer of reinforcing material 204 attached to the foam insulating panel, with the elastomeric vapor permeable air barrier layers 206, 208 and optionally with a layer of cementitious material 222 can be manufactured and sold as a pre-assembled product that can then be attached to the stud wall 16. Optionally, the foam insulating panel 202 can include the layer of reinforcing material, the elastomeric vapor permeable air barrier layers and optionally the layer of cementitious material on both the exterior surface 216 and the interior surface 218. The composite insulated foam panel 200 can also have the channels 68, 70, and 80 routed to one or both faces. The composite insulated foam panel 200 can be installed in any of the configurations shown in the FIGS. 5-8. The anchors used to attach the panel 202 to the framing members can be the same type shown in FIG. 1, 3, 5-11. Also, when two composite insulated foam panels 202 are connected together, the butt joint can be treated in the same manner as shown in FIGS. 1, 10 and 11. The joint tape can be made of the same materials mentioned above. The embedment material can be made of the same materials mentioned above. Alternatively the embedment material can be made from a cementitious polymer material, such as an acrylic cement material. With the foregoing layers preinstalled on the composite insulated panel 200, use of the composite insulated panel of the present invention will save a substantial amount of time and labor compared to prior art insulating panels.

Optionally, a layer of a decorative exterior cladding material can be directly applied to the layers of reinforcing material 44, 46, the elastomeric vapor permeable air barrier layers 52, 54 or the layer of cementitious material 220 using a conventional notched trowel adhesive, such as thin set or the like. As shown in FIGS. 1 and 2, thin brick 224 are applied to the layer of reinforcing material 46, to the elastomeric vapor permeable air barrier layer 52 and to the layer of cementitious material 220. Although thin brick are illustrated as being used as the decorative exterior cladding material, it is specifically contemplated that other decorative exterior cladding materials can also be used including, but are not limited to, brick, stone, tile, marble, plaster, stucco, cement board, cement siding, wood siding, composite siding, vinyl siding, aluminum siding and the like. As shown in FIG. 2, the thin brick 224, or any other exterior wall cladding, is adhesively attached to the air barrier membrane 54 using an adhesive. This method of attachment eliminates the need for mechanical fasteners associated with various installations of exterior wall claddings, and, therefore, eliminates the air barrier perforation associated with the use of mechanical fasteners. In this embodiment, the polymeric elastomeric vapor permeable air barrier membrane remains intact to perform as intended without any damage from penetration. The polymeric elastomeric vapor permeable air barrier membrane has very good bonding properties thereby acting as a bond enhancer between the exterior wall claddings and the foam insulating panel. Alternatively, the thin brick, or any other type of exterior wall cladding mentioned above, can be adhesively attached to the cementitious layer 220 using an adhesive as described above.

While the layer of cementitious material 220 in accordance with the present invention can be made from conventional concrete, mortar or plaster mixes; i.e., concrete mortar or plaster in which portland cement is the only cementitious material used in the concrete mortar or plaster, it is preferred as a part of the present invention to use the concrete mortar or plaster mixes disclosed in U.S. Pat. No. 8,545,749 (the disclosure of which is incorporated herein by reference in its entirety). Concrete mortar or plaster is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Specifically, the concrete, plaster and mortar mixes in accordance with the present invention comprise cementitious material, aggregate and water sufficient to at least partially hydrate the cementitious material. The amount of cementitious material used relative to the total weight of the concrete, mortar or plaster varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cementitious material ratio by weight is usually approximately 0.25 to approximately 0.7. Relatively low water-to-cementitious material ratios lead to higher strength but lower workability, while relatively high water-to-cementitious material ratios lead to lower strength, but better workability. Aggregate usually comprises 60% to 80% by volume of the concrete, mortar or plaster. However, the relative amount of cementitious material to aggregate to water is not a critical feature of the present invention; conventional amounts can be used. Nevertheless, sufficient cementitious material should be used to produce concrete mortar or plaster with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete, mortar or plaster used with the present invention is not critical and can be any aggregate typically used in concrete including, but not limited to, aggregate meeting the requirements of ASTM C33. The aggregate that is used in the concrete, mortar or plaster depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The preferred layer of cementitious material 220 for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of portland cement and increased amounts of recycled supplementary cementitious materials; i.e., slag cement and/or fly ash. This results in cementitious material and concrete that is more environmentally friendly. One or more cementitious materials other than slag cement or fly ash can also replace the portland cement, in whole or in part. Such other cementitious or pozzolanic materials include, but are not limited to, silica fume; metakaolin; rice hull (or rice husk) ash; ground burnt clay bricks; brick dust; bone ash; animal blood; clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements and other pozzolanic materials. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

The preferred cementitious material 220 for use with a disclosed embodiment of the present invention comprises 0% to approximately 100% by weight portland cement; preferably, 0% to approximately 80% by weight portland cement. The ranges of 0% to approximately 100% by weight portland cement and 0% to approximately 80% by weight portland cement include all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material comprises approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material 220 for use in one disclosed embodiment of the present invention also comprises 0% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

The preferred cementitious material 220 for use in one disclosed embodiment of the present invention also comprises 0% to approximately 50% by weight fly ash; preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash or any sub-combination thereof. Preferably the fly ash has an average particle size of <10 μm; more preferably 90% or more of the particles have a particles size of <10 μm.

The preferred cementitious material 220 for use in one disclosed embodiment of the present invention also comprises 0% to approximately 80% by weight fly ash, preferably approximately 10% to approximately 75% by weight fly ash, preferably approximately 10% to approximately 70% by weight fly ash, preferably approximately 10% to approximately 65% by weight fly ash, preferably approximately 10% to approximately 60% by weight fly ash, preferably approximately 10% to approximately 55% by weight fly ash, preferably approximately 10% to approximately 50% by weight fly ash, preferably approximately 10% to approximately 45% by weight fly ash, more preferably approximately 10% to approximately 40% by weight fly ash, most preferably approximately 10% to approximately 35% by weight fly ash, especially approximately 33⅓% by weight fly ash. In another disclosed embodiment of the present invention, the preferred cementitious material comprises 0% by weight fly ash, approximately 5% by weight fly ash, approximately 10% by weight fly ash, approximately 15% by weight fly ash, approximately 20% by weight fly ash, approximately 25% by weight fly ash, approximately 30% by weight fly ash, approximately 35% by weight fly ash, approximately 40% by weight fly ash, approximately 45% by weight fly ash or approximately 50% by weight fly ash, approximately 55% by weight fly ash, approximately 60% by weight fly ash, approximately 65% by weight fly ash, approximately 70% by weight fly ash or approximately 75% by weight fly ash, approximately 80% by weight fly ash or any sub-combination thereof. Preferably the fly ash has an average particle size of <10 µm; more preferably 90% or more of the particles have a particles size of <10 µm.

In one disclosed embodiment, the preferred cementitious material 220 for use with the present invention comprises approximately equal parts by weight of portland cement, slag cement and fly ash; i.e., approximately 33⅓% by weight portland cement, approximately 33⅓% by weight slag cement and approximately 33⅓% by weight fly ash. In another disclosed embodiment, a preferred cementitious material for use with the present invention has a weight ratio of portland cement to slag cement to fly ash of 1:1:1. In another disclosed embodiment, the preferred cementitious material for use with the present invention has a weight ratio of portland cement to slag cement to fly ash of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

The cementitious material disclosed above can also optionally include 0% to approximately 50% by weight ceramic fibers, preferably 0% to 40% by weight ceramic fibers, more preferably 0% to 30% by weight ceramic fibers, most preferably 0% to 20% by weight ceramic fibers, especially 0% to 15% by weight ceramic fibers, more especially 0% to 10% by weight ceramic fibers, most especially 0% to 5% by weight ceramic fibers. Wollastonite is an example of a ceramic fiber. Wollastonite is a calcium inosilicate mineral ($CaSiO_3$) that may contain small amounts of iron, magnesium, and manganese substituted for calcium. In addition the cementitious material can optionally include 0.1-25% calcium oxide (quick lime), calcium hydroxide (hydrated lime), calcium carbonate or latex or polymer admixtures, either mineral or synthetic, that have reactive hydroxyl groups.

In one disclosed embodiment, the cementitious material 220 for use with the present invention comprises 0% to approximately 100% by weight portland cement, 0% to approximately 90% by weight slag cement, and 0% to approximately 80% by weight fly ash. In one disclosed embodiment, the cementitious material for use with the present invention comprises 0% to approximately 80% by weight portland cement, 0% to approximately 90% by weight slag cement, and 0% to approximately 80% by weight fly ash. In another disclosed embodiment, the cementitious material for use with the present invention comprises 0% to approximately 70% by weight portland cement, 0% to approximately 90% by weight slag cement, and 0% to approximately 80% by weight fly ash. In another disclosed embodiment, the cementitious material for use with the present invention comprises 0% to approximately 60% by weight portland cement, 0% to approximately 90% by weight slag cement, and 0% to approximately 80% by weight fly ash. In another disclosed embodiment, the cementitious material for use with the present invention comprises 0% to approximately 50% by weight portland cement, 0% to approximately 90% by weight slag cement, and 0% to approximately 80% by weight fly ash. In another disclosed embodiment, the cementitious material for use with the present invention comprises less than 50% by weight portland cement, 10% to approximately 90% by weight slag cement, and 10% to approximately 80% by weight fly ash. In another disclosed embodiment, the cementitious material for use with the present invention comprises approximately 10% to approximately 45% by weight portland cement, approximately 10% to approximately 90% by weight slag cement, and 10% to approximately 80% by weight fly ash. In another disclosed embodiment, the cementitious material for use with the present invention comprises approximately 10% to approximately 40% by weight portland cement, approximately 10% to approximately 90% by weight slag cement, and 10% to approximately 80% by weight fly ash. In another disclosed embodiment, the cementitious material for use with the present invention comprises approximately 10% to approximately 35% by weight portland cement, approximately 10% to approximately 90% by weight slag cement, and 10% to approximately 80% by weight fly ash.

In another disclosed embodiment, the cementitious material 220 for use with the present invention comprises 0% to approximately 100% by weight portland cement; 0% to approximately 90% by weight slag cement; 0% to approximately 80% by weight fly ash; 0% to 10% by weight ceramic fiber; and 0% to approximately 25% by weight calcium oxide, calcium hydroxide, latex, acrylic or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 20% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 10% by weight ceramic fiber; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material 220 for use with the present invention comprises 0% to approximately 100% by weight portland cement; 0% to approximately 90% by weight slag cement; 0% to approximately 80% by weight fly ash; and 0.1% to 15% by weight ceramic fiber. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 15% by weight ceramic fiber. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 10% by weight ceramic fiber. In another disclosed embodiment, the cementitious material for use with the present invention comprises less than 50% by weight portland cement; 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 10% by weight ceramic fiber. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 10% by weight ceramic fiber.

In another disclosed embodiment, the cementitious material 220 for use with the present invention comprises 0% to approximately 100% by weight portland cement; 0% to approximately 90% by weight slag cement; 0% to approximately 80% by weight fly ash; 0% to 30% by weight Wollastonite; and 0% to approximately 25% by weight calcium oxide, calcium hydroxide, latex, acrylic or polymer admixtures, either mineral or synthetic, that have reactive hydroxyl groups, or mixtures thereof. In one disclosed embodiment, the cementitious material for use with the present invention comprises 0% to approximately 80% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 70% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 60% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises 0% to approximately 50% by weight portland cement; 0% to approximately 90% by weight slag cement; 0% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; 10% to approximately 80% by weight fly ash; 0% to approximately 30% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material 220 for use with the present invention comprises 0% to approximately 100% by weight portland cement; 0% to approximately 90% by weight slag cement; 0% to approximately 80% by weight fly ash; and 0.1% to 30% by weight Wollastonite. In one disclosed embodiment, the cementitious material for use with the present invention comprises 0% to approximately 80% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 70% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 60% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises 0% to approximately 50% by weight portland cement; 0% to approximately 90% by weight slag cement; 0% to approximately 80% by weight fly ash; and 0.1% to approximately 30% by weight Wollastonite. In another disclosed embodiment, the cementitious material for use with the present invention comprises less than 50% by weight portland cement; 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 40% by weight portland cement; approximately 10% to approximately 90% by weight slag cement; 10% to approximately 80% by weight fly ash; and 0.1% to approximately 30% by weight Wollastonite. In another disclosed embodiment, the cementitious material for use with the present invention comprises approximately 10% to approximately 35% by weight portland cement; approximately 10% to approximately 90% by weight slag cement; 10% to approximately 80% by weight fly ash; and 0.1% to approximately 30% by weight Wollastonite.

In another disclosed embodiment, the cementitious material 220 for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight polymer for making polymer modified concrete, mortar or plaster.

In another disclosed embodiment, the cementitious material 220 for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; and 0.1% to approximately 50% by weight ceramic fiber. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber.

In another disclosed embodiment, the cementitious material 220 for use with the present invention comprises 0% to approximately 100% by weight portland cement; 0% to approximately 90% by weight slag cement; 0% to approximately 80% by weight fly ash, wherein the combination of portland cement, slag cement and fly ash comprise at least 50% by weight; 0.1% to approximately 50% by weight ceramic fiber and 0.1% to approximately 50% by weight polymer for making polymer modified concrete, mortar or plaster. In another disclosed embodiment, the cementitious material for use with the present invention comprises approximately 10% to approximately 45% by weight portland cement; approximately 10% to approximately 90% by weight slag cement; 10% to approximately 80% by weight fly ash; and 0.1% to approximately 50% by weight ceramic fiber and 0.1% to approximately 50% by weight polymer for making polymer modified concrete, mortar or plaster.

The portland cement, slag cement and fly ash can be combined physically or mechanically in any suitable manner and is not a critical feature. For example, the portland cement, slag cement and fly ash can be mixed together to form a uniform blend of dry material prior to combining with the aggregate and water. If dry polymer powder is used, it can be combined with the cementitious material and mixed together to form a uniform blend prior to combining with the aggregate or water. If the polymer is a liquid, it can be added to the cementitious material and combined with the aggregate and water. Or, the portland cement, slag cement and fly ash can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred cementitious material for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures or additional supplementary cementitious material ("SCM") can also be used with the cementitious material of the present invention. Such mineral admixtures include, but are not limited to, silica fume, glass powder and high reactivity metakaolin. Although mineral admixtures can be used with the cementitious material of the present invention, it is believed that mineral admixtures are not necessary.

It is specifically contemplated that the cementitious-based material from which the layer of cementitious material 220 is made can include reinforcing fibers made from material including, but not limited to, steel, plastic polymers, glass, basalt, Wollastonite, carbon, and the like. The use of reinforcing fiber in the layer of cementitious material 220 made from polymer modified concrete, mortar or plaster provide the layer of cementitious material with improved flexural strength, as well as improved wind load capability and blast resistance.

While the foregoing invention has been disclosed as being useful as a wall sheathing system, it is specifically contemplated that the present invention can be used as a roofing system. For a roofing system, the composite insulated panels 12, 14 can be attached to plywood sheeting overlaying roofing rafters (not shown). A fluid applied roof membrane (not shown) can be applied to the layers of reinforcing material 44, 46, the elastomeric vapor permeable air barrier layer 54 and/or the layer of cementitious material 220. Fluid applied roof membranes are well known in the art. For example, Kemper System America, Inc., West Seneca, N.Y., USA sells a line of fluid applied roof membrane products including Kempertec EP/EP5-Primer with silica sand, Kempertec D-Primer, Kempertec AC primer with silica sand, Kempertec BSF-R Primer, Kemperol 2K-PUR with 165 fleece, Kemperol BR/BR-M with 165 fleece, and Kempertec TC traffic surfacing. These products are polyurethane-based, polyester-based and polymethylmethacrylate-based.

Sika Corporation, Lyndhurst, N.J., USA offers a fluid applied roof membrane product under the designation Sikalastic® RoofPro Liquid Applied Membrane. This product includes Sika® Bonding Primer (a two component prereacted epoxy resin dispersed in water and a waterborne modified polyamine solution), Sikalastic® 601 BC and Sikalastic® 621 TC are both moisture cured polyurethane-based systems. Sika® Reemat and Flexitape systems are a nylon mesh reinforcing system.

Siplast USA, Irving, Tex., USA offers a fluid applied roof membrane product under the designation Parapro PMMA Roof Membrane System. This product includes primers designated Pro Primer R, Pro Primer W and Pro Primer T (all polymethylmethacrylate based resins); Paradiene 20 underlayment and Parapro Roof Membrane Resin (a polymethylmethacrylate based resin).

Alternatively, a polymeric roofing membrane can be used with the composite insulated panels 12, 14. The polymeric roofing membrane (not shown) can be applied to the layers of reinforcing material 44, 46, the elastomeric vapor permeable air barrier layer 54 and/or the layer of cementitious material 220. On top of the seam tape and layer of cementitious material, if present, or the layer of reinforcing material, if the layer of cementitious material is not present, are first and second sheets of polymeric roof membrane, such as EPDM (ethylene propylene diene monomer (M-call) rubber), PVC (polyvinyl chloride) or TPO (thermoplastic polyolefin). The polymeric roof membrane is attached to the layer of cementitious material, if present, or the layer of reinforcing material by a suitable adhesive. TPO membranes can also be attached by using mechanical fasteners and washers in a manner well know in the art. The first sheet of polymeric roof membrane is attached to the second sheet of polymeric roof membrane by methods known in the art, such as by hot air welding.

Firestone Building Product, Indianapolis, Ind., USA offers a TPO roof membrane system designated UltraPly TPO Roofing System and an EPDM roof membrane system under the designation RubberGard EPDM. GAF Corp., Wayne, N.J., USA offers a TPO roof membrane system designated EverGardTPO single ply roofing membrane. Overlapping sheets of TPO roofing membrane are joined together by hot air welding.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A product comprising:
    a composite panel comprising:
        a foam insulating panel having a first primary surface and an opposite second primary surface, wherein the first primary surface defines a single plane;
        a first layer of a vapor permeable polymeric elastomeric material substantially covering the single plane of the first primary surface; and
        a first layer of porous reinforcing material defining a single plane disposed on the single plane of the first primary surface of the foam insulating panel, wherein the first layer of porous reinforcing material is at least partially embedded in the vapor permeable polymeric elastomeric material; and
    a fastener for attaching the composite panel to a framing structure, wherein the fastener comprises a washer and wherein at least a portion of the first layer of the polymeric elastomeric material and at least a portion of the first layer of porous reinforcing material are disposed between the washer and the first primary surface.

2. The product of claim 1, wherein the foam insulating panel comprises a plurality of perforations extending from the first primary surface to the second primary surface.

3. The product of claim 1, wherein the foam insulating panel comprises a plurality of channels formed in the first primary surface.

4. The product of claim 1, wherein the foam insulating panel comprises a plurality of channels formed in the second primary surface.

5. The product of claim 1, wherein the foam insulating panel comprises a plurality of channels formed in the first and second primary surfaces.

6. The product of claim 1 further comprising a second layer of vapor permeable polymeric elastomeric material on the second primary surface such that at least a portion of a second layer porous reinforcing material is at least partially embedded in the second layer of polymeric elastomeric material.

7. The product of claim 1 further comprising a layer of cementitious material on the first layer porous reinforcing material.

8. The product of claim 7 further comprising a layer of exterior cladding material attached to the layer of cementitious material.

9. The product of claim 8, wherein the exterior cladding material comprises brick, thin brick, stone, tile, marble, plaster, stucco, cement board, cement siding, wood siding, composite siding, vinyl siding, or aluminum siding.

10. The product of claim 1 further comprising a layer of exterior cladding material attached to the first layer of porous reinforcing material.

11. The product of claim 1, wherein the first layer of porous reinforcing material is a woven fabric.

12. The product of claim 1, wherein the first layer of porous reinforcing material is a nonwoven material.

13. The product of claim 1, wherein the first layer of porous reinforcing material is a fiberglass fabric, matt, web or mesh.

14. The product of claim 1, wherein the first layer of porous reinforcing material is a fiberglass mesh.

15. A wall structure comprising:
a plurality of vertical studs horizontally spaced from each other to form a wall framing structure;
a composite panel comprising:
  a foam insulating panel having a first primary surface and an opposite second primary surface, wherein the second primary surface is disposed adjacent the plurality of wall studs and wherein the first primary surface defines a single plane; and
  a layer of a vapor permeable polymeric elastomeric material substantially covering the single plane of the first primary surface; and
  a layer of porous reinforcing material defining a single plane disposed on the single plane of the first primary surface of the foam insulating panel, wherein the layer of fiberglass reinforcing material is at least partially embedded in the vapor permeable polymeric elastomeric material; and
a plurality of fasteners for attaching the composite panel to the wall framing structure, wherein each of the fasteners comprises a washer and wherein at least a portion of the first layer of a polymeric elastomeric material and at least a portion of the first layer of porous reinforcing material are disposed between each of the washers and the first primary surface.

16. The wall structure of claim 15 further comprising a layer of cementitious material on the first layer of porous reinforcing material.

17. The wall structure of claim 15, wherein the washer comprises a body member and a plurality of projections extending outwardly from the body member and wherein the plurality of projections penetrate through the first layer of vapor permeable polymeric elastomeric material and the first layer of porous reinforcing material into the foam insulating panel.

18. A product comprising:
a first composite panel comprising:
  a first foam insulating panel having a first primary surface and an opposite second primary surface, wherein the first primary surface defines a single plane;
  a first layer of a vapor permeable polymeric elastomeric material substantially covering the single plane of the first primary surface of the first foam insulating panel; and
  a first layer of porous reinforcing material defining a single plane disposed on the single plane of the first primary surface of the foam insulating panel, wherein the first layer of fiberglass reinforcing material is at least partially embedded in the first layer of vapor permeable polymeric elastomeric material; and
a second composite panel disposed adjacent the first composite panel, the second composite panel comprising:
  a second foam insulating panel having a first primary surface and an opposite second primary surface, wherein the first primary surface defines a single plane;
  a second layer of a vapor permeable polymeric elastomeric material substantially covering the single plane of the first primary surface of the second foam insulating panel; and
  a second layer of porous reinforcing material forming a single plane disposed on the single plane of the first primary surface of the second foam insulating panel, wherein the second layer of porous reinforcing material is at least partially embedded in the second layer of vapor permeable polymeric elastomeric material; and
a fastener for attaching the first and second composite panels to a framing structure, wherein the fastener comprises a washer and wherein at least a portion of the first layer porous reinforcing material is disposed between the washer and the first primary surface of the first foam insulating panel and at least a portion of the second layer porous reinforcing material is disposed between the washer and the first primary surface of the second foam insulating panel.

19. The product of claim 18, wherein the washer comprises a body member and a plurality of projections extending outwardly from the body member and wherein at least one projection penetrates the first layer porous reinforcing material and into the first foam insulating panel and at least a second projection penetrates the second layer porous reinforcing material and into the second foam insulating panel.

20. The product of claim 18 further comprising a third layer of a vapor permeable polymeric elastomeric material and a third layer of porous reinforcing material at least partially embedded in the third layer of vapor permeable polymeric elastomeric material disposed on a joint formed between the first and second foam insulating panels.

* * * * *